(12) United States Patent
Russ et al.

(10) Patent No.: US 8,970,059 B2
(45) Date of Patent: Mar. 3, 2015

(54) RAM AIR TURBINE GENERATOR HOUSING

(75) Inventors: David Everett Russ, Rockford, IL (US);
Kanthi Gnanam Kannan, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 213 days.

(21) Appl. No.: 13/431,057

(22) Filed: Mar. 27, 2012

(65) Prior Publication Data
US 2013/0257053 A1    Oct. 3, 2013

(51) Int. Cl.
*F01D 15/10*    (2006.01)

(52) U.S. Cl.
USPC .......................................................... 290/52

(58) Field of Classification Search
USPC ......... 290/52–55, 43–44; 416/170 R, 142, 38
See application file for complete search history.

(56) References Cited

U.S. PATENT DOCUMENTS

| | | |
|---|---|---|
| 2,248,405 A | 7/1941 | Freeman |
| 3,168,140 A * | 2/1965 | Bodine, Jr. ............... 166/301 |
| 3,360,239 A | 12/1967 | Swearingen |
| 4,742,976 A | 5/1988 | Cohen |
| 4,991,796 A | 2/1991 | Peters et al. |
| 5,122,036 A | 6/1992 | Dickes et al. |
| 5,145,324 A | 9/1992 | Dickes et al. |
| 5,487,645 A | 1/1996 | Eccles |
| 5,564,903 A | 10/1996 | Eccles et al. |
| 6,331,099 B1 | 12/2001 | Eccles et al. |
| 6,580,179 B2 | 6/2003 | Eccles et al. |
| 6,676,379 B2 | 1/2004 | Eccles et al. |
| 7,077,631 B2 | 7/2006 | Eccles et al. |
| 7,086,760 B2 | 8/2006 | Chuang |
| 8,436,483 B2 * | 5/2013 | Perner et al. ................ 290/44 |
| 2002/0122717 A1 * | 9/2002 | Ghetzler et al. ............ 415/35 |
| 2011/0155096 A1 * | 6/2011 | Pekrul ....................... 123/243 |
| 2011/0176947 A1 * | 7/2011 | Pekrul ........................ 418/1 |
| 2011/0229309 A1 | 9/2011 | Russ |
| 2011/0229342 A1 | 9/2011 | Russ |
| 2011/0236218 A1 | 9/2011 | Russ et al. |

* cited by examiner

*Primary Examiner* — Jean F Duverne
(74) *Attorney, Agent, or Firm* — Carlson, Gaskey & Olds, P.C.

(57) ABSTRACT

An example ram air turbine generator assembly includes a generator housing that holds a generator in axial alignment with a hydraulic pump. The generator housing includes a wall having contacting portions that contact a stator of the generator and spaced portions that are radially spaced from the stator. The generator wall is designed to be strong enough to withstand HLSD and windmilling vibrations, while flexible enough to accommodate thermal expansion.

21 Claims, 6 Drawing Sheets

RAM AIR TURBINE GENERATOR HOUSING

BACKGROUND

This disclosure relates to ram air turbines utilized to provide electric and hydraulic power to an aircraft. More particularly, this disclosure relates to a housing of a ram air turbine generator.

A ram air turbine is used to generate supplemental power in an aircraft by extracting power from an air stream along the exterior of the aircraft during flight. The ram air turbine includes a turbine that drives an electric motor and/or hydraulic pump. In operation, the turbine is moved from a stowed position within the aircraft to a deployed position just outside of the aircraft such that the blades of the turbine are in the air stream and also have an operating clearance with the aircraft. The turbine is mounted at the end of a strut and drives a turbine drive shaft that in turn drives the electric motor and/or hydraulic pump.

The ram air turbine may experience extreme loads, such as during high level, short duration events (HLSDs). During an aircraft engine blade loss event, the severe HLSD vibrations occur first as the engine spools down. Then, as it continues to turn due to air loads, a high unbalance load continues to drive the longer duration windmilling vibrations. Either or both of these vibrations could significantly reduce the fatigue life of RAT components.

As known, windmilling is generally unpowered aircraft engine rotation that occurs at frequencies below most RAT resonant frequencies. However, HLSD is high level resonant vibration wherein one or more RAT modes are excited to resonance as the engine spools down and this causes high loads through the RAT housings. As the aircraft engine speed drops, the excitation frequency seen by the RAT sweeps from high to low frequencies, passing through normal RAT resonance frequencies on the way down. Thus it is not generally possible to design a RAT with natural frequencies that avoid a HLSD sweep event. Strengthen the RAT helps the RAT to endure the event. Also, the duration of spool down time is a fraction of the windmilling duration and so the number of fatigue cycles for HLSD is relatively small. Consequently, a practical design of the load bearing housings is feasible with appropriate load paths and careful attention to minimizing stress concentrations A generator housing of the ram air turbine needs to withstand these loads while accommodating changes in part dimensions due to thermal variations.

SUMMARY

An example ram air turbine generator assembly includes a generator housing that holds a generator in axial alignment with a hydraulic pump. The generator housing includes a wall having contacting portions that contact a stator of the generator and spaced portions that are radially spaced from the stator.

Another example ram air turbine generator housing assembly includes a wall having a portion extending axially along the length of a generator stator. The wall swivels with the generator between a stowed position and a deployed position about pivot. Portions of the wall that are vertically aligned with the pivot when the generator is in the stowed position are radially thickened relative to other portions of the wall.

Yet another example ram air turbine generator assembly includes a generator housing having a wall. The wall has contacting portions that contact a stator of the generator and spaced portions that are radially spaced from the stator. At least 68% of the contacting portions and the spaced portions have a common radial thickness. A ratio of the common radial wall thickness to a diameter of the stator is from 0.018 to 0.022.

An example method of installing a generator stator within a generator housing includes thermally fitting a generator stator within a generator housing. The wall of the generator housing extends axially along the length of the generator stator. The wall has contacting portions that contact a generator stator of the generator and spaced portions that are radially spaced from the generator stator. At least 68% of the contacting portions and the spaced portions have a common radial wall thickness. A ratio of the common radial wall thickness to a diameter of the generator stator is from 0.018 to 0.022.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
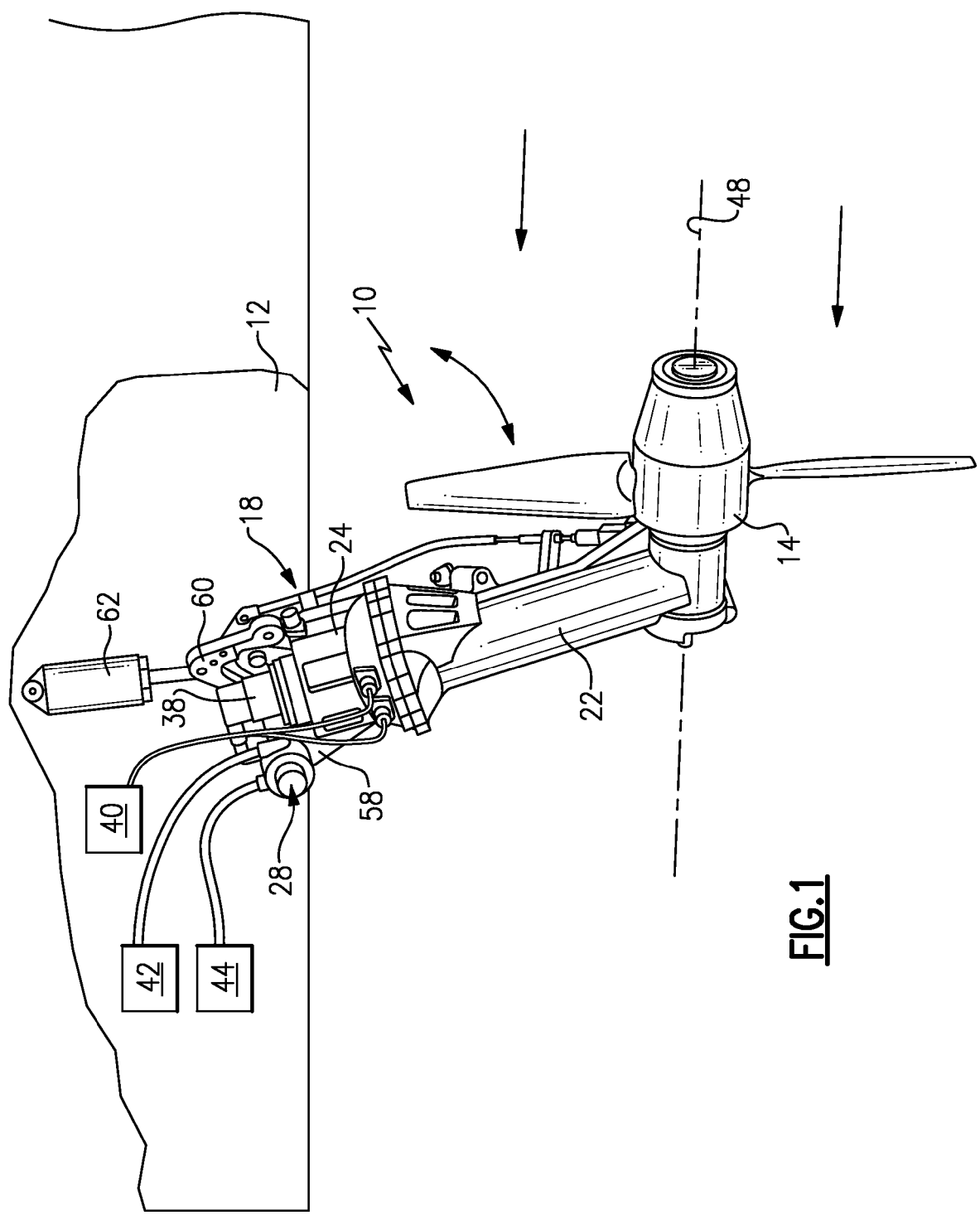
FIG. 1 is a schematic view of an example ram air turbine including a generator and a hydraulic pump.
Figure 2:
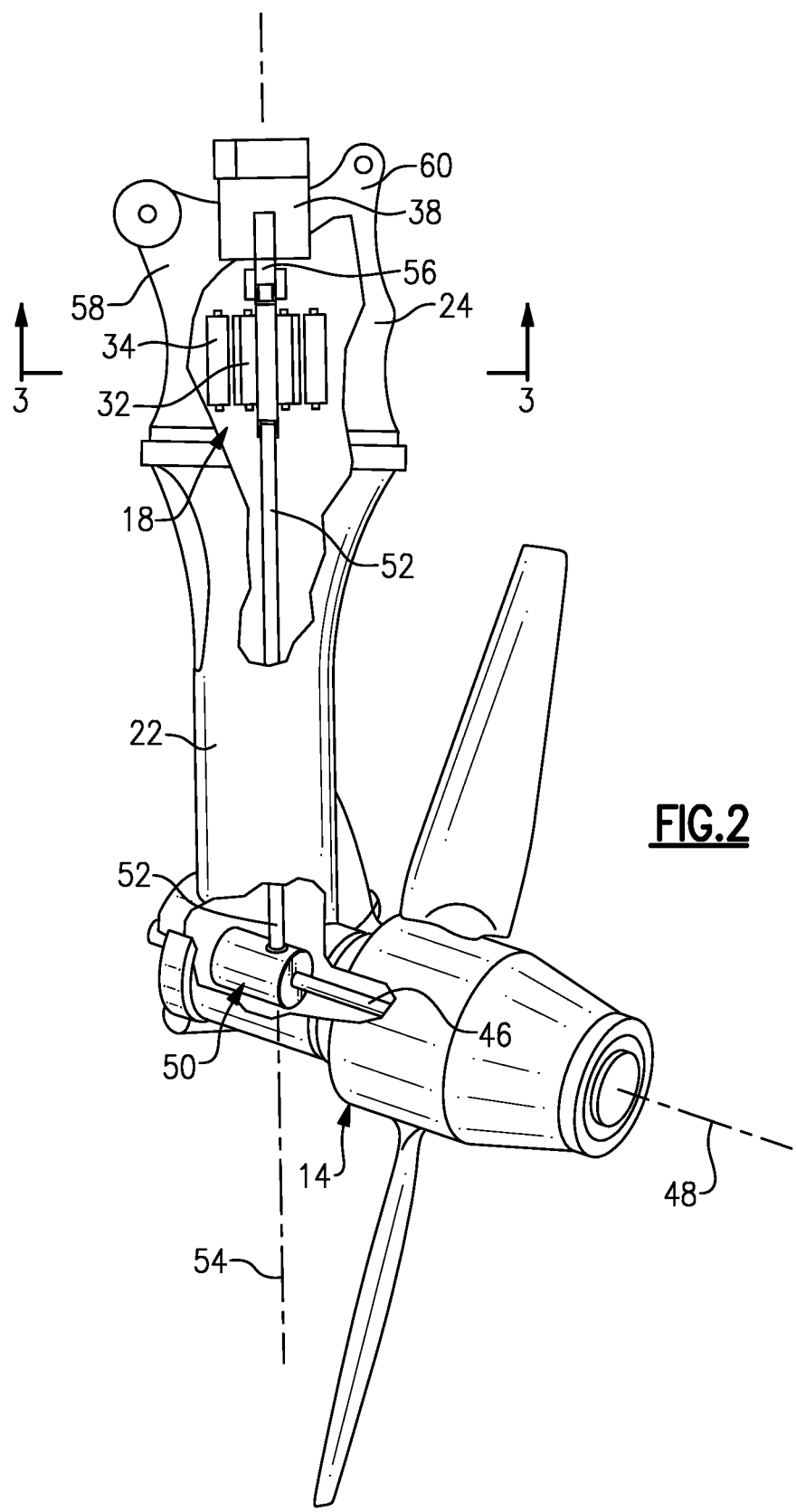
FIG. 2 is a sectional view of the FIG. 1 ram air turbine.
Figure 3:
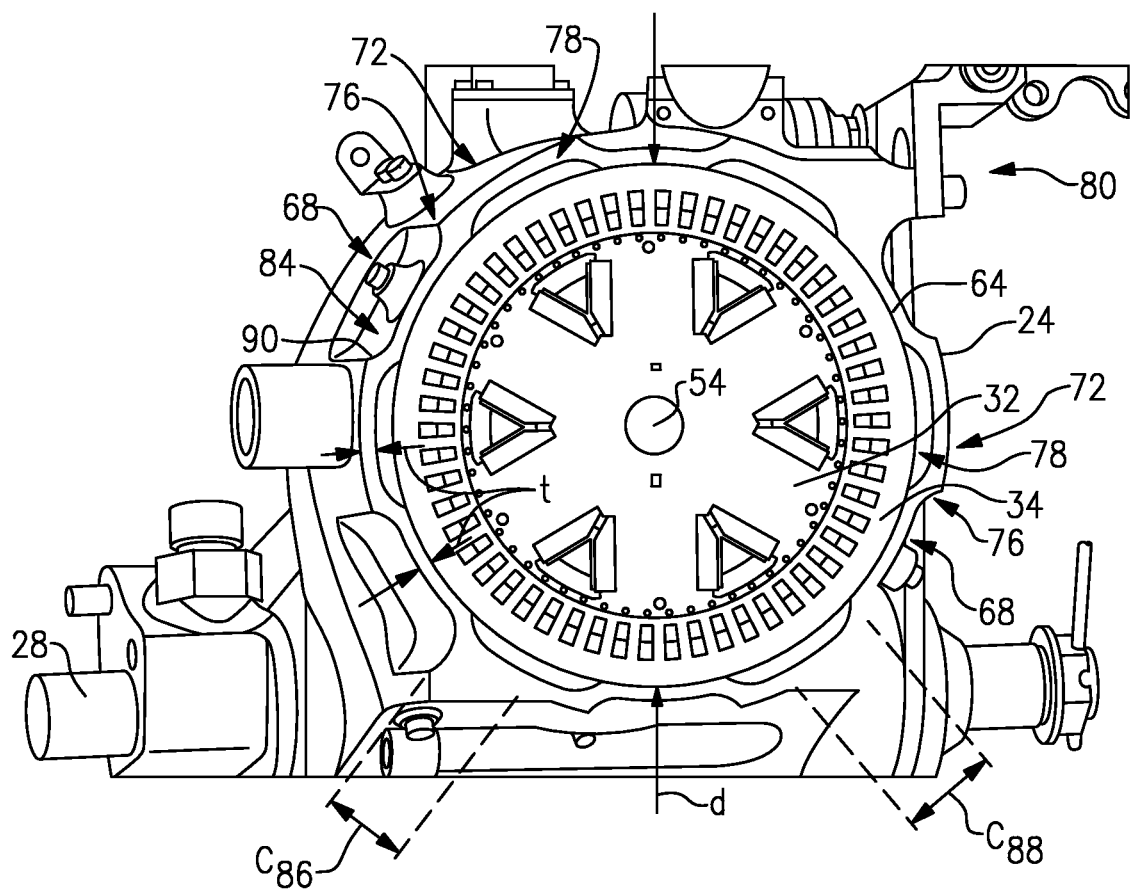
FIG. 3 is a section view at line 3-3 in FIG. 2.
Figure 4:
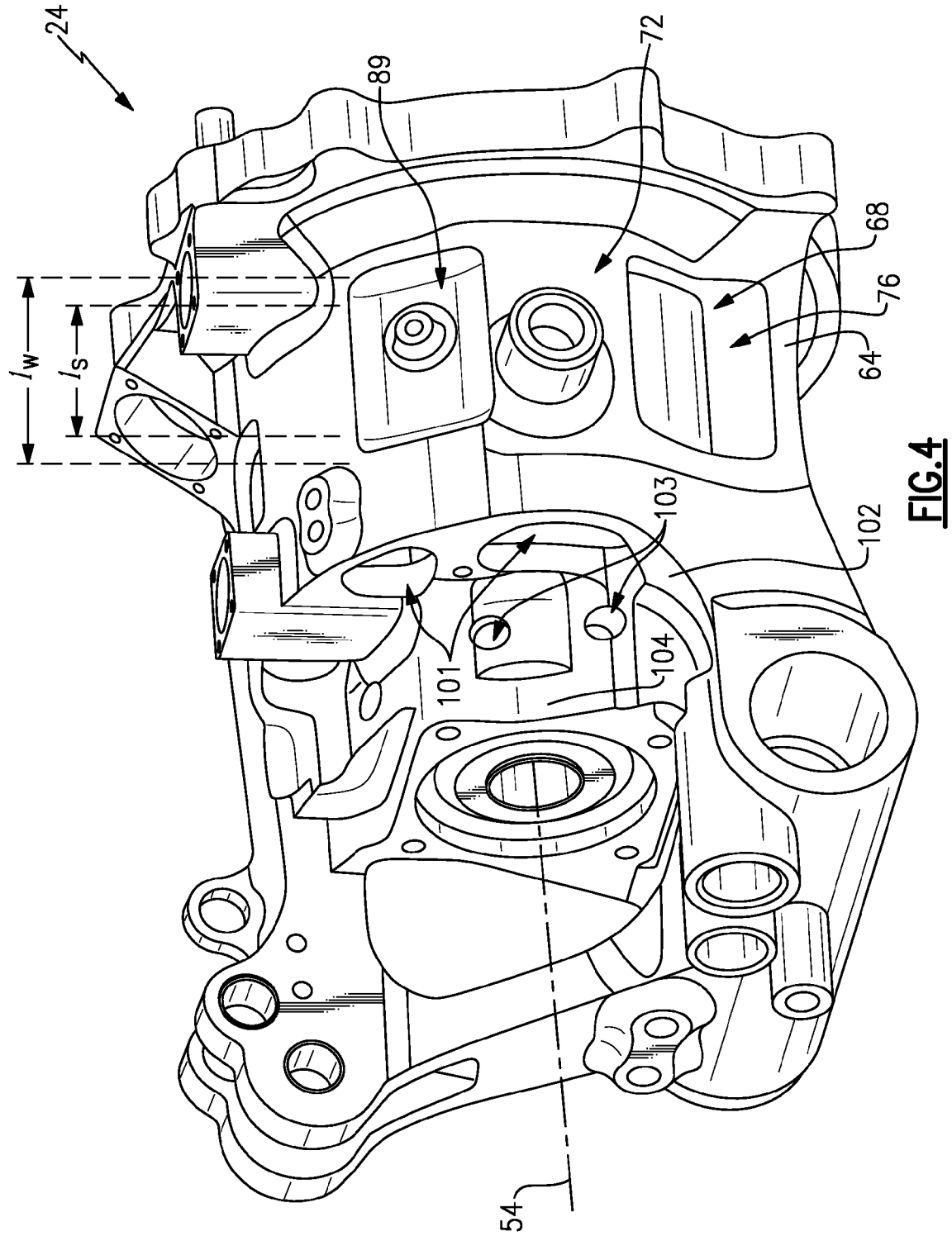
FIG. 4 is a perspective view of an example generator housing of the FIG. 1 ram air turbine.

Referring to FIGS. 1 and 2, an example ram air turbine assembly (RAT) 10 is mounted to an airframe 12 and is deployable to provide both electric power and hydraulic power. The example RAT 10 includes a turbine 14 that rotates responsive to air flow along the outside of the airframe 12. The turbine 14 is supported at the end of strut 22 attached to a generator housing 24. The generator housing 24 is mounted for rotation to the airframe 12 with a swivel post pivot 28, which functions as a pivot for the housing 24.

A ram air turbine generator assembly 18 includes a generator rotor 32, a generator stator 34, and the generator housing 24. During assembly, the generator rotor 32 and the generator stator 34 are placed within the housing 24. In one example, the generator stator 34 is press-fit within the generator housing 24.

The generator rotor 32 is coupled to a hydraulic pump 38. The generator rotor 32 is rotated relative to a stator 34 to generate electric power that can be supplied to an aircraft system, such as is schematically indicated at 40. The hydraulic pump 38 receives fluid from a fluid supply 44 and pumps the fluid to various systems indicated at 42 that utilize pressurized fluid for operation. The generator assembly 18 and the hydraulic pump 38 are axially aligned. The rotating portions of the generator assembly 18 and the hydraulic pump 38 rotate about a common axis 54.

The turbine 14 rotates to drive a turbine driveshaft 46 about an axis 48. The turbine driveshaft 46 drives a gearbox 50. The example gearbox 50 is disposed aft of the turbine 14 and along the axis 48 of rotation of the turbine 14 and turbine driveshaft 46. The example gearbox 50 drives a torque tube 52 that rotates about the axis 54, which is transverse to the axis 48. The torque tube 52 extends from the gearbox 50 through the strut 22 to the generator rotor 32. The torque tube 52 is coupled to the generator rotor 32.

The example gearbox 50 includes gears that provide a desired ratio of rotational speed between the turbine driveshaft 46 and the torque tube 52. In this example, the torque tube 52 is rotated at a greater speed than the turbine driveshaft 46. The gearbox 50 can be configured to provide any desired speed ratio relative to rotation of the turbine 14.

The speed at which the torque tube 52 is rotated is determined to provide the desired rotational speed required to drive the generator rotor 32 and produce a desired amount of electrical energy at the desired frequency. The electrical energy produced by the generator is then transmitted to the aircraft system schematically indicated at 40.

A second drive shaft 56 couples the hydraulic pump 38 in rotation with the generator rotor 32 such that the hydraulic pump 38 rotates at the same speed as the generator rotor 32. As the hydraulic pump 38 and the generator rotor 32 are coupled to rotate together, the hydraulic pump 20 communicates pressurized fluid to the aircraft systems 30 at the same time as the generator produces electric power. The hydraulic pump 38 and the generator 18 may supply power together or separately.

The generator housing 24 includes a mounting bracket 60 and an integral swivel bracket 58. The mounting bracket 60 attaches to an actuator 62. The actuator 62 drives movement of the RAT 10 between a stowed position within the airframe 12 and the deployed position schematically shown in FIG. 1.

The swivel bracket 58 mounts to the swivel post pivot 28 to support the RAT 10. The strut 22 is attached to the generator housing 24 and therefore moves with the pivoting movement of the generator housing 24. The hydraulic pump 38 is mounted to the generator housing 24 and therefore also rotates with the generator housing 24 during movement to and from the deployed position.

Referring to FIGS. 3 to 6, the housing 24 includes a wall 64 that extends circumferentially about the axis 54. The wall 64 provides a cavity 66 that receives the rotor 32 and the stator 34. Notably, the wall 64 does not directly contact the entire outer circumference of the stator 34. The wall 64 includes some contacting portions 68 and some spaced portions 72. The contacting portions 68 directly contact the stator 34, and the spaced portions 72 are radially spaced out from the stator 34. In this example, the wall 64 includes six contacting portions 68 circumferentially alternating with six spaced portions 72.

Notably, throughout most of the housing 24, the contacting portions 68 and the spaced portions 72 have approximately the same radial thickness t. In this example, the spaced portions 72 have a thickness t of 0.121 inches (3.073 millimeters) and the contacting portions 68 have a thickness of 0.135 inches (3.429 millimeters). The average thickness is 0.128 inches (3.251 millimeters). The spaced portions 72 are 90% of the thickness of the contacting portions 68. In another example, both portions are 0.128 inches (3.251 millimeters) thick. The 0.128 inches (3.251 millimeters) average thickness could vary by +/−10% to achieve a desired ratio. For example, at 0.115 inches (2.921 millimeters) thickness, the ratio is 0.115/6.398=0.18 min. At 0.141 inches (3.581 millimeters) thickness, the ratio is 0.141/6.398=0.22.

In this example, at an axial cross-section of the wall 64 that is perpendicular to the axis 54 (generally shown in FIG. 3), at least 68% of the sectioned contacting portions and the sectioned spaced portions have a common radial thickness. Thus, the average thickness t of the wall 64 is generally the same about the circumference of the wall 64. In one example, the thickness is about from 0.115 to 0.141 inches (2.92 to 3.58 millimeters).

In this example, the stator 34 has an outer diameter d, and a ratio of the common radial thickness to the diameter d of the stator 34 is from 0.018 to 0.022. Also, in this example, the outer diameter d of the stator 34 is 6.405 inches (162.687 millimeters) and the outer diameter at the generator housing in this section is 7.62 inches (193.548 millimeters).

Transition portions 76 extend from the contacting portions 68 to the spaced portions 72 so that the wall 64 is continuous about the entire stator 34. Generally, in the section view of FIG. 3, the transition portions 76 have a radial and a circumferential component, and the contacting portions 68 and the spaced portions 72 lack a change in radial component.

Fluctuating ambient temperatures and thermal energy levels may cause the wall 64 and the stator 34 to expand or contract relative to each other. Providing the contacting portions 68, the spaced portions 72, and the transition portions 76 enables wall 64 to flex and accommodate these thermal stress variations, while still providing support sufficient for withstanding high level short duration and windmilling vibrations in the stowed configuration. The wall thickness of transition portions 72 is approximately the same as the contacting portions 68 to maintain appropriate circumferential flexibility.

The radial gap between the spaced portions 72 and the stator 34 function as axially extending channels 78. The spaced portions 72 provide the outer boundary of the channels 78. The channels 78 are used to duct flow air axially along the circumference of the stator 34. The flow of air removes thermal energy from the generator assembly 18 to cool the generator assembly 18. The hot air is outlet through slots (101) cut out on the top face (102) of the generator housing 24. Additional vent holes (103) are provided at the base of the side walls of the mounting pedestal (104) for the pump housing.

The example wall 64 extends axially at least the axial length of the stator 34. In some examples, the axial length of the stator 34 is $l_s$, and the axial length of the wall 64 is $l_w$, which is greater than $l_s$. In this example, the axial length of the main stator 34 is 3.725 inches (94.6 millimeters). The axial length of the wall of the generator housing is 5.88 inches (149.4 millimeters). The thickness of the splitline is 0.862 inches (21.9 millimeters).

Figure 5:
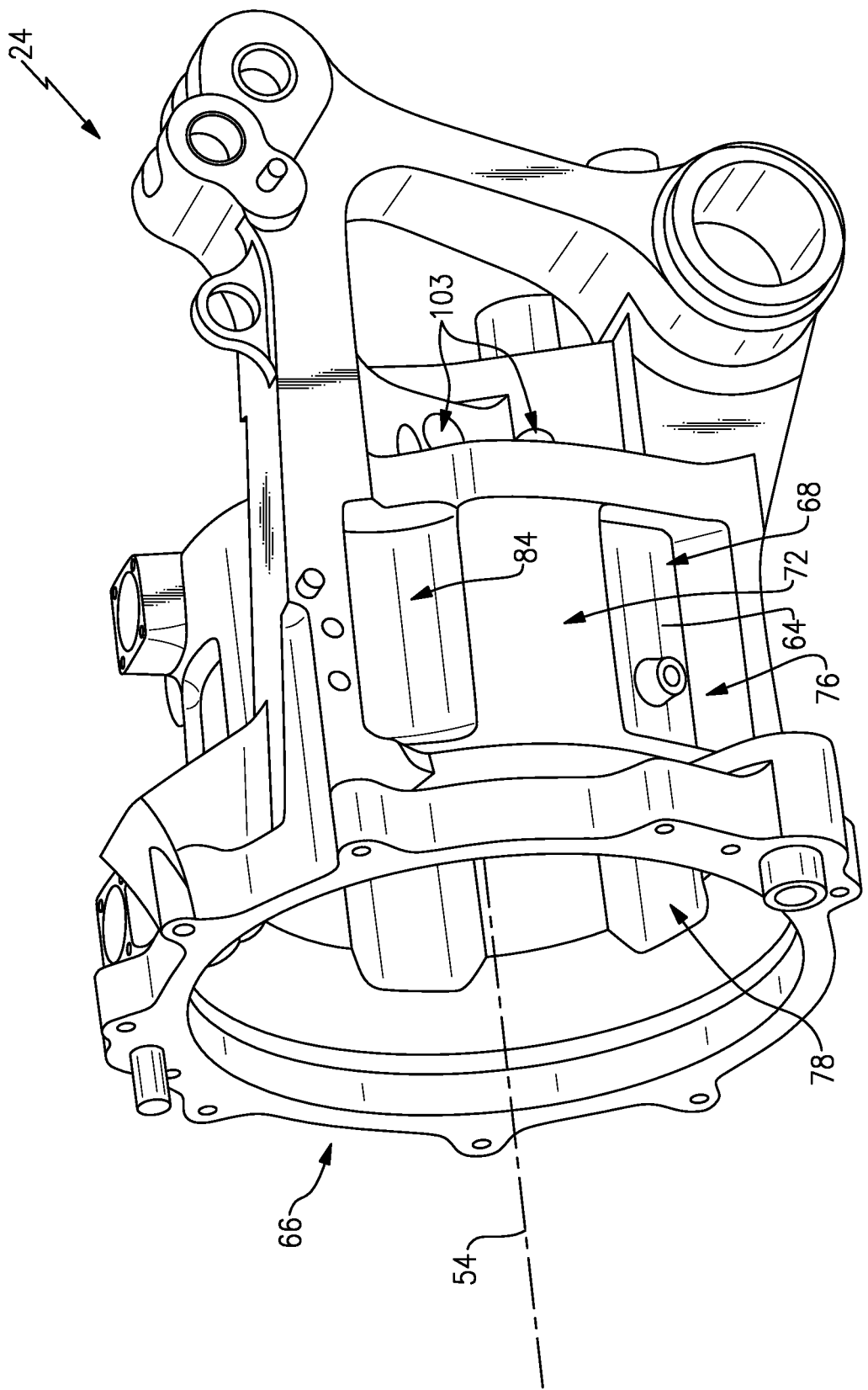
FIG. 5 is another perspective view of the example generator housing of the FIG. 1 ram air turbine.
Figure 6:
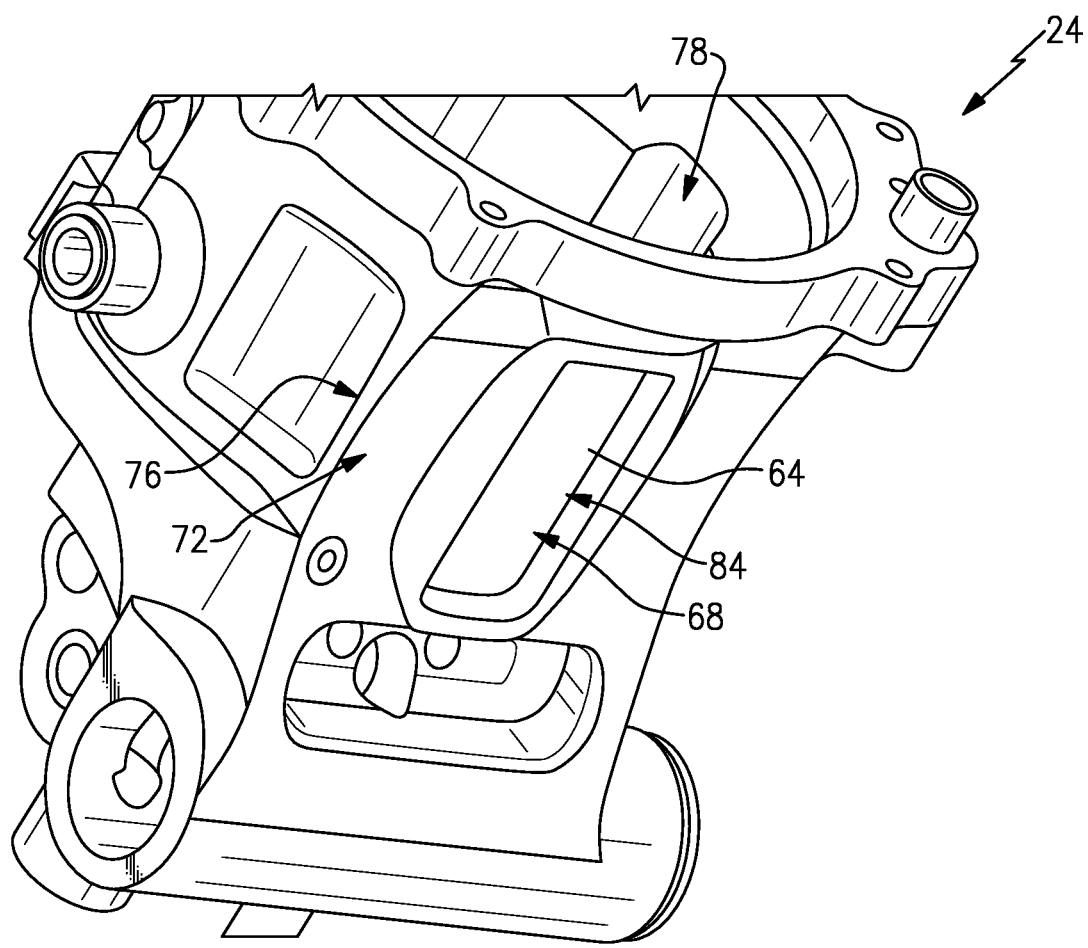
FIG. 6 is yet another perspective view of the example generator housing of the FIG. 1 ram air turbine.

As seen in FIG. 5, a strong, stiff load path is required at location 80 between the strut and the actuator attachment lug. This area forms an anchoring feature to the circumferential ring around the stator. Since it only occurs at one location on the circumferential ring, it does not restrict the flexibility of the circumferential ring to expand as needed for thermal expansion. The location 80, in this example, extends circumferentially about 9% of a circumference of the wall 64.

Since the thickness of the wall 64 is generally consistent about the axis 54, the wall 64 includes divots 84 at the circumferential locations of the contacting portions 68. The divots 84 reflect the differences between the radial locations of the contacting portions 68 and the spaced portions 72. As appreciated, if the wall 64 did not include the divots 84, the thickness of the wall 64 would increase in the areas of the contacting portions 68 relative to the spaced portions 72. The divots 84 thus aid in an uniform hoop-type expansion of the wall 64 and also as material reduction feature.

The example transition portions 76 include relatively large radii. In one example, an outer radius 90 of one of the transition portions 76 is about 0.520 inches (13.2 millimeters).

To facilitate the housing 24 accommodating high level short duration loading and other types of loads, the example housing 24 is strengthened in selected areas. For example, although the thickness of the wall 64 is relatively consistent, the radially thickness is increased in areas 86 and 88 to some amount greater than t. The areas 86 and 88 are considered lateral stiffening ribs in the load path from the strut to pivot post 28.

If the turbine 14 is considered to extend from the axis 54 at a 12:00 position, the areas 86 and 88 are located at 4:30 and a 7:30 positions, respectively. The areas 86 and 88 extend circumferentially a distance $C_{86}$ and $C_{88}$. In one example, these distances each represent about 15 degrees each of the 360 degree circumference of the wall 64.

When the example generator assembly 18 is in a stowed position, the areas 86 and 88 are vertically aligned with the swivel post pivot 28. The areas 86 and 88 are also said to be in a common plane with the swivel post pivot 28. Vertical, in this example, refers to the typical position of the stowed generator assembly 18 when on the ground or in straight or level flight. The areas 86 and 88 are thus in the load path extending from the strut interface back to the swivel post pivot 28.

The example housing 24 includes other features contributing to a high strength, low weight design resistant to high vibration level. For example, additional material may be added to the areas of the housing 24 at or near the swivel bracket 58 (see FIG. 4). The housing 24 may also include a large sweeping radius in the area of the swivel bracket 58.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A ram air turbine generator assembly, comprising:
a generator housing that holds a generator in axial alignment with a hydraulic pump, the generator housing includes a wall having contacting portions that contact a stator of the generator and spaced portions that are radially spaced from the stator, wherein the stator is radially outboard a rotor, wherein the wall pivots with the generator between a stowed position and a deployed position about a pivot, and a load from the generator housing is transferred to the pivot along a load path, wherein portions of the wall within the load path are radially thickened relative to other portions of the wall.

2. The ram air turbine generator assembly of claim 1, wherein the spaced portions of the wall provide a radially outer cooling channel boundary for the air flow around stator.

3. The ram air turbine generator assembly of claim 1, wherein, at an axial cross-section of the wall that is perpendicular to a rotational axis of the generator, at least 68% of the contacting portions and the spaced portions have a common radial thickness.

4. The ram air turbine generator assembly of claim 1, wherein the generator housing includes exactly six contacting portions alternating circumferentially with exactly six spaced portions.

5. The ram air turbine generator assembly of claim 1, wherein the wall is rigidly connected to a component other than the generator housing at a single circumferential location.

6. The ram air turbine generator assembly of claim 5, wherein the generator stator has an axial length, and the single circumferential location is within the axial length of the generator housing.

7. The ram air turbine generator assembly of claim 1, wherein the wall includes transition portions connecting the contacting portions and the spaced portions, wherein the transitions portions extend radially relative to the contacting portions and the spaced portions.

8. The ram air turbine generator housing assembly of claim 1, wherein the load path is essentially in the same plane with the pivot when the generator is in a stowed position.

9. The ram air turbine generator assembly of claim 1, wherein at least 68% of the contacting portions and the spaced portions have a common radial thickness, and a ratio of the common radial thickness to a diameter of the stator is from 0.115 to 0.141.

10. The ram air turbine generator assembly of claim 9, wherein the wall has a portion extending axially a length of the stator, and this portion of the wall rigidly connects to another structure separate from the generator housing at a single circumferential location.

11. The ram air turbine generator assembly of claim 10, wherein the single circumferential location extends circumferentially about 9% percent of a circumference of the wall.

12. The ram air turbine generator assembly of claim 10, wherein the wall is radially thickened relative to other areas of the wall at the single circumferential location.

13. A ram air turbine generator housing assembly, comprising:
a wall having a portion extending axially a length of a generator stator, the wall pivoting with the generator between a stowed position and a deployed position about a pivot, wherein portions of the wall that are vertically aligned with the pivot when the generator is in the stowed position are radially thickened relative to other portions of the wall.

14. The ram air turbine generator housing assembly of claim 13, within a load from the generator housing is transferred to the pivot along a load path and the portions of the wall that are vertically aligned with the pivot when the generator is in the stowed position are within the load path.

15. The ram air turbine generator housing assembly of claim 13, wherein the thickened portions and the pivot are in a common plane.

16. The ram air turbine generator housing assembly of claim 13, wherein the wall has contacting portions that contact a generator stator of the generator and spaced portions that are radially spaced from the generator stator, the spaced portions providing cooling channels together with the stator.

17. The ram air turbine generator housing assembly of claim 13, wherein the portion of the wall rigidly connects to a structure other than the generator housing at a single circumferential location.

18. The ram air turbine generator housing assembly of claim 13, wherein the wall has contacting portions that contact the generator stator and spaced portions that are radially spaced from the generator stator, wherein at least 68% of the contacting portions and the spaced portions have a common radial thickness, and a ratio of the common radial thickness to a diameter of the stator is from 0.115 to 0.141.

19. The ram air turbine generator housing assembly of claim 18, wherein the wall has a portion extending axially a length of the generator stator, and this portion of the wall rigidly connects to another structure separate from the wall at a single circumferential location.

20. The ram air turbine generator housing assembly of claim 19, wherein the single circumferential location extends circumferentially about 9% percent of a circumference of the wall.

21. The ram air turbine generator assembly of claim 19, wherein the wall is radially thickened relative to other areas of the wall at the single circumferential location.

* * * * *